(12) United States Patent (10) Patent No.: US 8,811,554 B2
Furtner (45) Date of Patent: Aug. 19, 2014

(54) INTERFACE CIRCUIT AS WELL AS METHOD FOR RECEIVING AND/OR FOR DECODING DATA SIGNALS

(75) Inventor: Wolfgang Furtner, Fuerstenfeldbruck (DE)

(73) Assignee: NXP B.V., Eindhoven (NL)

( * ) Notice: Subject to any disclaimer, the term of this patent is extended or adjusted under 35 U.S.C. 154(b) by 2133 days.

(21) Appl. No.: 11/722,563

(22) PCT Filed: Dec. 16, 2005

(86) PCT No.: PCT/IB2005/054284
§ 371 (c)(1),
(2), (4) Date: May 2, 2008

(87) PCT Pub. No.: WO2006/067716
PCT Pub. Date: Jun. 29, 2006

(65) Prior Publication Data
US 2008/0304599 A1 Dec. 11, 2008

(30) Foreign Application Priority Data
Dec. 23, 2004 (EP) .................................... 04106924

(51) Int. Cl.
*H04L 7/00* (2006.01)
*H03D 3/24* (2006.01)
*G09G 5/00* (2006.01)
*H04L 7/033* (2006.01)

(52) U.S. Cl.
CPC .............. *G09G 5/006* (2013.01); *H04L 7/0338* (2013.01); *H04L 7/0331* (2013.01)
USPC ............ 375/354; 375/371; 375/374; 375/376

(58) Field of Classification Search
USPC ......... 375/295, 306, 307, 316, 339, 354, 355, 375/360, 362, 373–376, 371, 365–367, 370, 375/359, 346, 326–328, 294, 293, 375/240.26–240.29, 219; 327/141, 327/144–147, 149–156, 158–161
See application file for complete search history.

(56) References Cited

U.S. PATENT DOCUMENTS 5,905,769 A 5/1999 Lee et al.
5,914,991 A * 6/1999 Gigandet et al. .............. 375/355
6,272,193 B1 8/2001 Eglit (Continued)

FOREIGN PATENT DOCUMENTS

EP 1313257 A1 5/2003

*Primary Examiner* — Sam K Ahn
*Assistant Examiner* — Linda Wong

(57) ABSTRACT

In order to provide an interface circuit (100; 100') as well as a method for receiving and/or for decoding, in particular for recovering, data signals (D; R, G, B), in particular high speed data signals, for example high speed sequential digital data signals, wherein at least one sampling clock signal (SC), in particular at least one multi-phase sampling clock signal (PC[n-1:0]) with n different phases, and/or the data signals (D; R, G, B) are delayed, and wherein it is possible to optimize the components, in particular the analog components, for a fixed operating frequency, it is proposed that the sampling clock signal (SC), in particular the multi-phase sampling clock signal (PC[n-1:0]), is asynchronous—to at least one interface clock signal (IC), by which the interface circuit (100; 100'), in particular the input of the interface circuit (100; 100'), can be provided with, and/or to the data signals (D; R, G, B).

11 Claims, 13 Drawing Sheets

(56) References Cited

U.S. PATENT DOCUMENTS

| | | |
|---|---|---|
| 6,389,548 B1 | 5/2002 | Bowles |
| 6,556,640 B1 | 4/2003 | Baba |
| 6,606,360 B1 * | 8/2003 | Dunning et al. ............. 375/354 |
| 6,611,219 B1 | 8/2003 | Lee et al. |
| 6,700,722 B2 * | 3/2004 | Ruegg et al. .................... 360/51 |
| 7,231,009 B2 * | 6/2007 | Kim et al. ..................... 375/354 |
| 7,567,615 B2 * | 7/2009 | Ochi .............................. 375/232 |
| 2003/0091137 A1 | 5/2003 | Vallet et al. |
| 2004/0091073 A1 | 5/2004 | Smith |
| 2005/0030073 A1 * | 2/2005 | Wakayama et al. ........... 327/156 |

* cited by examiner

INTERFACE CIRCUIT AS WELL AS METHOD FOR RECEIVING AND/OR FOR DECODING DATA SIGNALS

The present invention relates to an interface circuit for receiving and/or for decoding, in particular for recovering, data signals, in particular high speed data signals, for example high speed sequential digital data signals, the interface circuit comprising the features of the preamble of claim 1.

The present invention further relates to a method for receiving and/or for decoding, in particular for recovering, such data signals, the method comprising the steps of the preamble of claim 8.

Conventional interfaces convey high bandwidth information over a limited number of transmission lines; this is achieved by high speed sequential binary transmission techniques. For graphic applications, for example the D[igital]V[isual]I[nterface] standard according to the DVI version 1.0 specification dated Apr. 2, 1999 (cf. http://www.ddwg.org/) has become increasingly popular and replaces more and more prior analog interfaces.

Beside the DVI standard, H[igh-]D[efinition]M[ultimedia]I[nterface] (cf. http://www.hdmi.org/) is an industry-supported, uncompressed, all-digital audio/video interface. HDMI provides an interface between any compatible digital audio/video source, such as a set-top box, a D[igital]V[ersatile]D[isc] player, or an A[udio]/V[ideo] receiver and a compatible digital audio and/or video monitor, such as a D[igital]T[ele]V[ision]. In this context, the HDMI standard is basically backwards-compatible with the DVI standard, i. e. a DVI source can drive an HDMI monitor, or vice versa, by means of a suitable adapter or cable.

The DVI standard demands transmission rates up to 1.65 Gigabit per second; however, due to long transmission lines and/or due to low quality cables, the skew between the data channels as well as between the data channel and the clock channel can be well above the bit duration. A receiver has to compensate for these skews and has to adapt to varying skews under changing transmission conditions (for example bending cables).

Figure 4A:
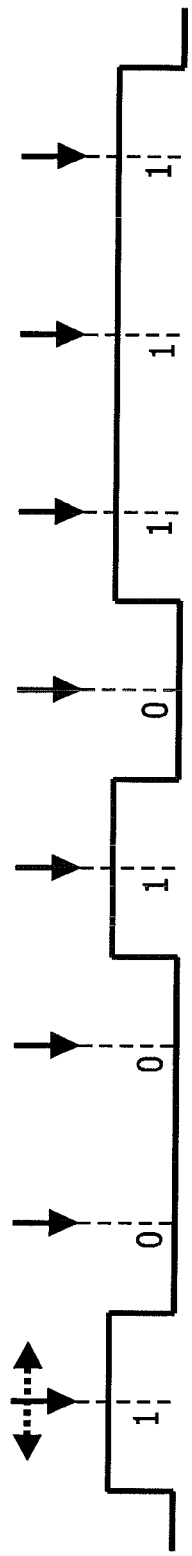

A conventional method to cope with high skews is to dynamically adjust the relation between the data D and a sampling clock SC (=synchronous sampling technique with phase adjust; cf. FIG. 4A). A prior art synchronous sampling architecture A as shown in FIG. 1 (with the elements to the left of the dotted line L residing in the analog/mixed signal design domain and with the elements to the right of the dotted line L residing in the digital domain) regenerates the sampling clock SC (bit-clock or fractions of it) from the interface clock IC via a phase-locked loop PLL.

A delay-locked loop DLL delays the sample clock SC such that sampling takes place in a sampler S right in the middle of the eye diagram of the transmitted data signal (for instance by correlating the non-sampling edge of a fifty percent duty cycle sampling clock with data transitions).

Figure 1:
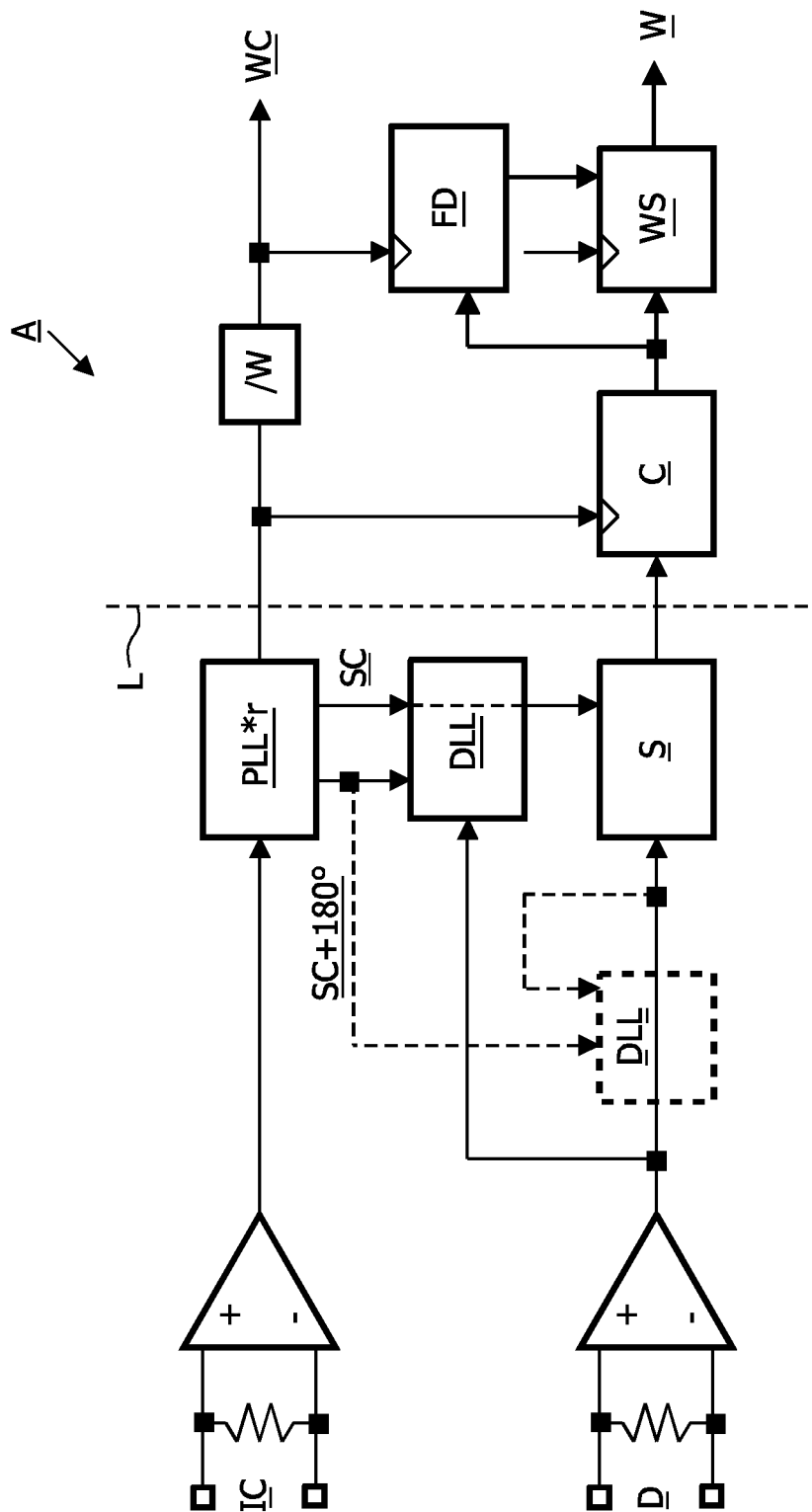

Alternatively, the delay-locked loop DLL may delay the data signal (cf. dotted wires in FIG. 1). In other words, the correlation of interface clock IC and data D is adjusted with the delay-locked loop DLL either in the clock path (=upper path in FIG. 1) or in the data path (=lower path in FIG. 1).

To reduce the maximum system frequency an architecture with multiple sampling phases based on the same principle can be constructed.

Finally, the sampled payload bits are accumulated or aggregated to a sequence containing at least one full word. This is achieved in a collector C by collecting a number of bits which is equal to twice the maximum word length, i. e. to two words. Since a phase correlation between data D and interface clock IC cannot be assumed, the word boundaries can only be detected from the data stream itself in a frame detector FD. Special coding techniques are employed on the transmitter side in order to allow proper word selection in a word selecter WS.

Figure 4B:
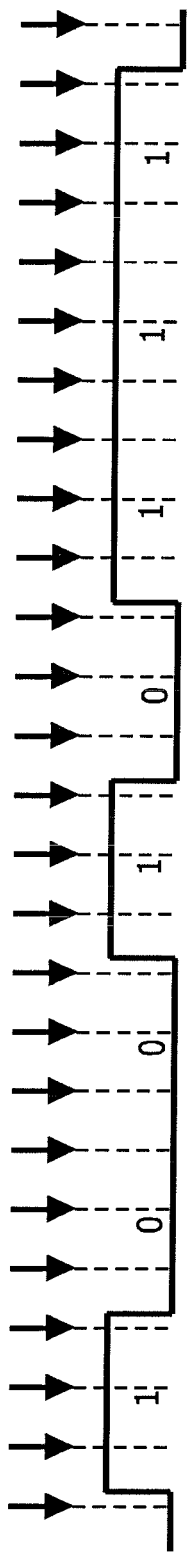

A further conventional method to cope with high skews is represented by the synchronous super sampling technique of FIG. 4B. An example for a receiver circuit for high speed sequential binary data can be found in prior art document U.S. Pat. No. 5,905,769. Synchronous super sampling replaces the analog adjustment of the sampling phase by collecting a multitude of samples per bit (also called over-sampling) and selecting the proper sample afterwards, in the digital domain.

Figure 2:
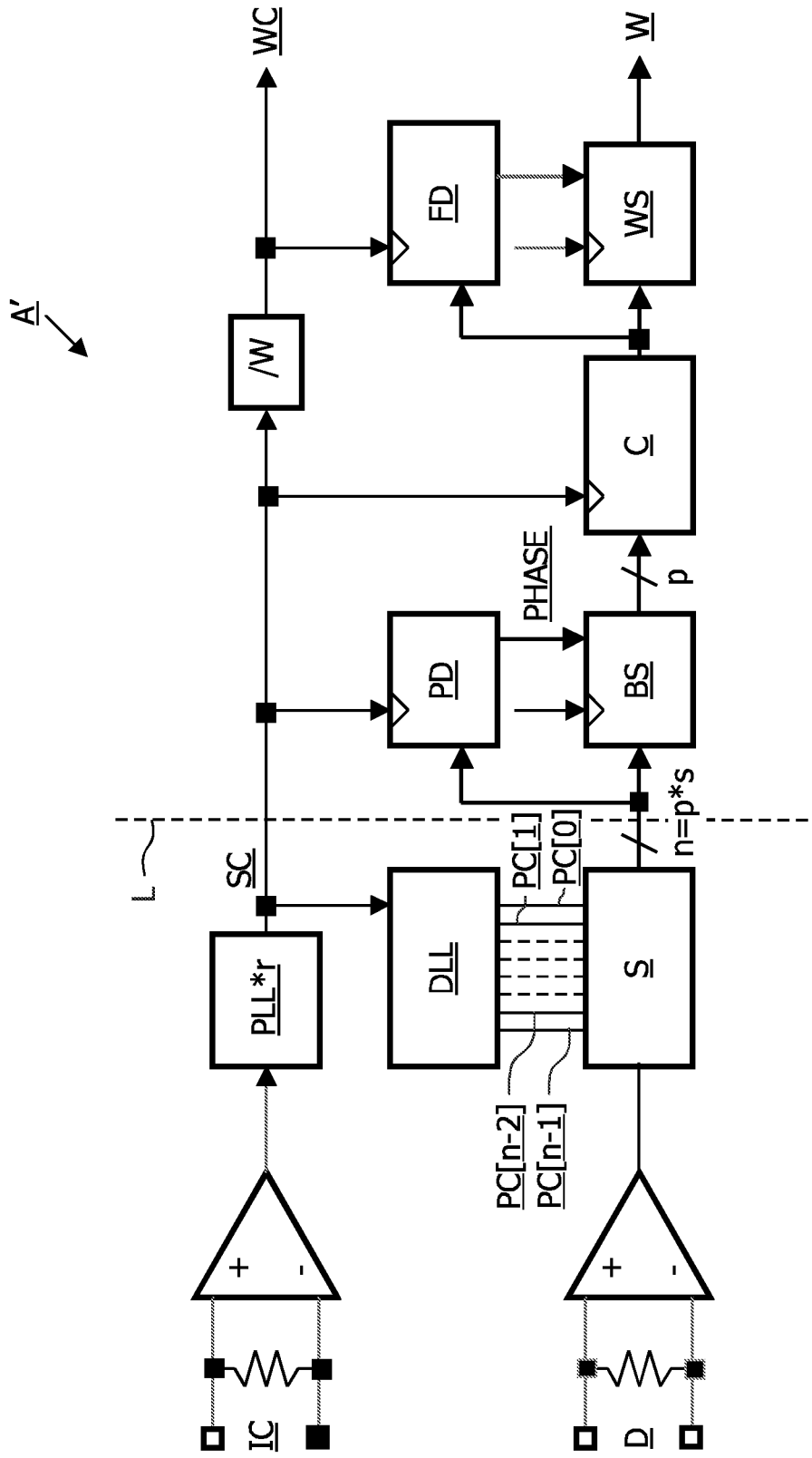

In a prior art synchronous super sampling architecture as A' shown in FIG. 2 (with the elements to the left of the dotted line L being analog and with the elements to the right of the dotted line L being digital), the sampling clock SC (bit-clock or fractions of it) is derived from the interface clock IC with a phase-locked loop PLL. A delay-locked loop DLL generates a multi-phase sampling clock PC[n-1:0] with n different phases. The multitude of sampling phases may also be directly generated by means of a multi-phase PLL.

Figure 3:
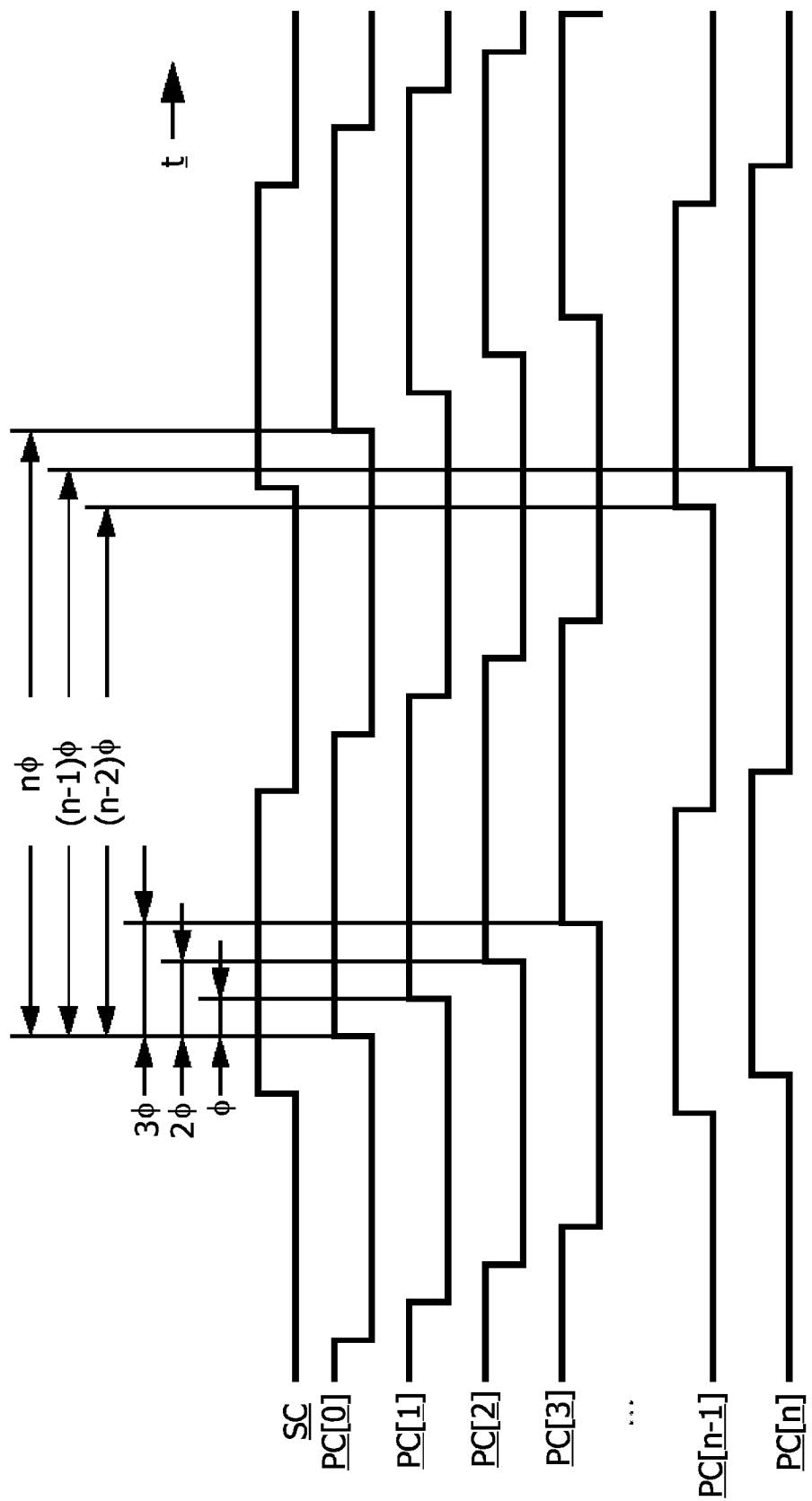

The n individual sampling clocks PC[n-1], . . . , PC[0] are skewed by a phase delay of phi=t_SC/n, like depicted in FIG. 3. N samples in the form of an n-bit vector of samples are collected with the synchronous multi-phase clock, i. e. with every sampling clock SC, which contains p payload bits; s super samples per payload bit p are provided (n=p*s); in other words, several (namely p) payload bits may be extracted from aggregated or collected samples s.

Some of the samples s may have been taken during transitions of the data line and are therefore not reliable but super sampling assures that a majority of samples is correct; the optimal sampling phase is calculated and/or selected and/or filtered based on this majority assumption.

The word recovery is typically performed as described with reference to the conventional synchronous sampling example of FIG. 1 (in FIG. 2, the reference numeral BS denotes a bit select unit and the reference numeral PD denotes a phase detect unit).

Regarding an interface circuit as defined above in the chapter "Technical field" as well as a method as defined above in the chapter "Technical field", multi-phase clocks are used; however, these multi-phase clocks have a fixed ratio to the data rate, as can be taken for instance from the following prior art documents:

Prior art document U.S. Pat. No. 6,272,193 B1 refers to a receiver to recover data encoded in a serial communication channel wherein it is relied on a (fixed) plurality of samples per symbol; a data phase record is kept.

In prior art document U.S. Pat. No. 6,556,640 B1, a digital phase-locked loop circuit as well as a signal regeneration method are disclosed. A multi-phase sampling frequency being almost the same like the bit rate is required in prior art document U.S. Pat. No. 6,556,640 B1; sampling takes place by selecting the right clock and by delaying the data.

Prior art document U.S. Pat. No. 6,611,219 B1 discloses an oversampling data recovery apparatus as well as a corresponding method. However, a fixed (integer) ratio of samples per bit is assumed; besides, according to prior art document U.S. Pat. No. 6,611,219 B1 counters for each group of phases are employed in order to count the occurrence of data transitions for this phase.

Prior art document US 2003/0091137 A1 refers to a transition detection, validation and memorization circuit. It is relied on a fixed ratio between sampling clock and data rate; for phase detection a rather special algorithm is employed.

In prior art document US 2004/0091073 A1, a data recovery circuit, a phase detection circuit as well as a method for detecting and correcting phase conditions are revealed. A first group of samples and a second group of samples are separated by half a data period; moreover the sampling clock is adjusted in a traditional phase-locked loop kind of way.

Starting from the disadvantages and shortcomings as described above and taking the prior art as discussed into account, an object of the present invention is to further develop an interface circuit as defined above in the chapter "Technical field" as well as a method as defined above in the chapter "Technical field" in such way that the components, in particular the analog components, as for example the phase-locked loop unit, the delay-locked loop unit and the sampling means, can be optimized for a fixed operating frequency.

The object of the present invention is achieved by an interface circuit comprising the features of claim 1 as well as by a method comprising the features of claim 8. Advantageous embodiments and expedient improvements of the present invention are disclosed in the respective dependent claims.

The present invention is principally based on the technical idea of an asynchronous sampling and data recovery architecture and method for high speed digital interfaces; therefor, an apparatus as well as a method for reception and data recovery of high speed sequential digital signals are provided.

The present invention supports interfaces with a dedicated clock signal and with an implicit clocking by transitions in the data signal; according to the present teaching, the reception and the decoding of high speed sequential digital signals, for example on D[igital]V[isual]I[nterface] basis and/or on H[igh-]D[efinition]M[ultimedia]I[nterface] basis, is enabled. In this way, the present invention exhibits higher design robustness and flexibility compared to conventional solutions.

In particular, the present innovation utilizes an asynchronous super sampling architecture. Thus the at least one sampling clock can be maintained independent of the transmission frequency, i. e. at least one free running sampling clock is provided.

In particular, the present invention neither tries to determine a correct sampling phase nor assumes a fixed (integer) ratio of samples per bit nor has counters for each group of phases in order to count the occurrence of data transitions for this phase (like for instance in prior art document U.S. Pat. No. 6,611,219 B1). However, the data is extracted from measuring the run-length of the data and/or from measuring the run-time of the data.

Unlike various prior art solutions where a multi-phase sampling frequency being almost the same like the bit rate is required (cf. for example prior art document U.S. Pat. No. 6,556,640 B1), the sampling frequency according to the present invention is arbitrary. Whereas sampling takes place in prior art by selecting the right clock and by delaying the data, according to a preferred implementation of the present invention the clocks are not selected but the correct sample is processed and selected from the oversampled data without further sampling.

According to an advantageous embodiment of the present invention, sampling circuitry, such as P[hase-]L[ocked]L[oop], D[elay-]L[ocked]L[oop] and sampler(s), can be optimized for a fixed sampling frequency. Skews between the clock and the data channels can be compensated with digital processing. Adaptation of varying skews happens instantly and is not limited by analog filter loops.

Optionally the clock period can be obtained from data channels with an appropriate clocking scheme. For lower bit rates robustness improves due to the increased number of samples per bit. There is no minimum transmission rate implied by the bandwidth of analog components.

The advantages of the fixed clock super sampling architecture according to the present invention can be summarized as follows:
- optimization of analog components, as for example of P[hase-]L[ocked]L[oop], of D[elay-]L[ocked]L[oop] and of sampler(s), for a fixed operating frequency;
- high speed adaptation to phase variations as well as to bit rate variations, not limited by analog filter loops;
- optional clock recovery from the data stream;
- increased robustness for lower bit rates;
- no lower frequency limit, operation down to D[irect] C[urrent] bit rate.

The present invention finally relates to the use of at least one interface circuit as described above and/or of the method as described above for receiving and/or for decoding, in particular for recovering, high speed sequential digital data signals on the basis of the D[igital]V[isual]I[nterface] standard and/or on the basis of the H[igh-]D[efinition]M[ultimedia]I[nterface] standard by way of an asynchronous sampling technique, in particular by way of an asynchronous super sampling technique, for example by maintaining the sampling clock signal independent of the transmission phase and/or of the transmission frequency of the data signals.

The present invention is particularly suited for applications with a high and/or varying skew between clock channel and data channel. One or multiple serial data streams are supported.

Figure 4C:
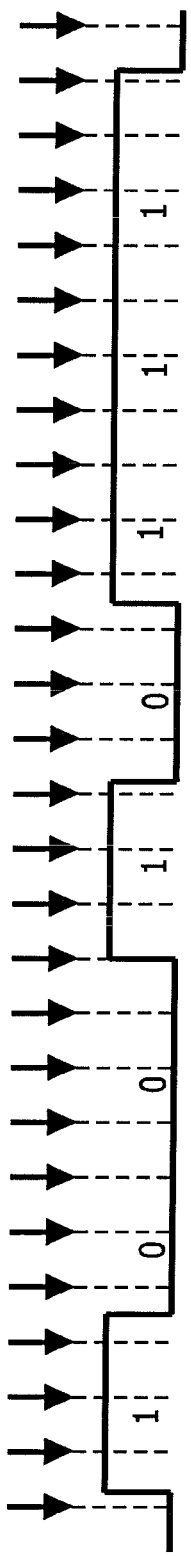
Figure 5:
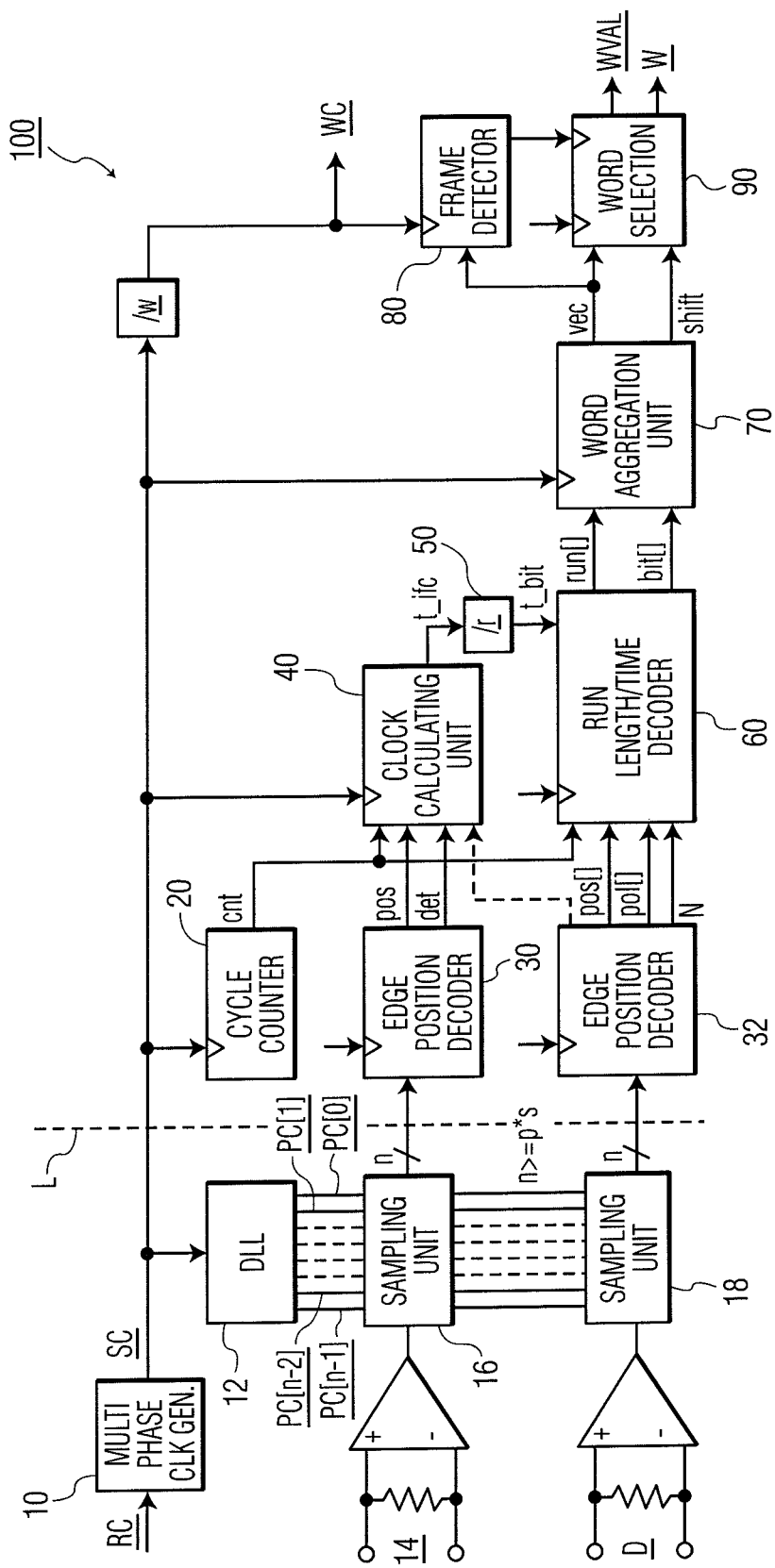
Figure 6:
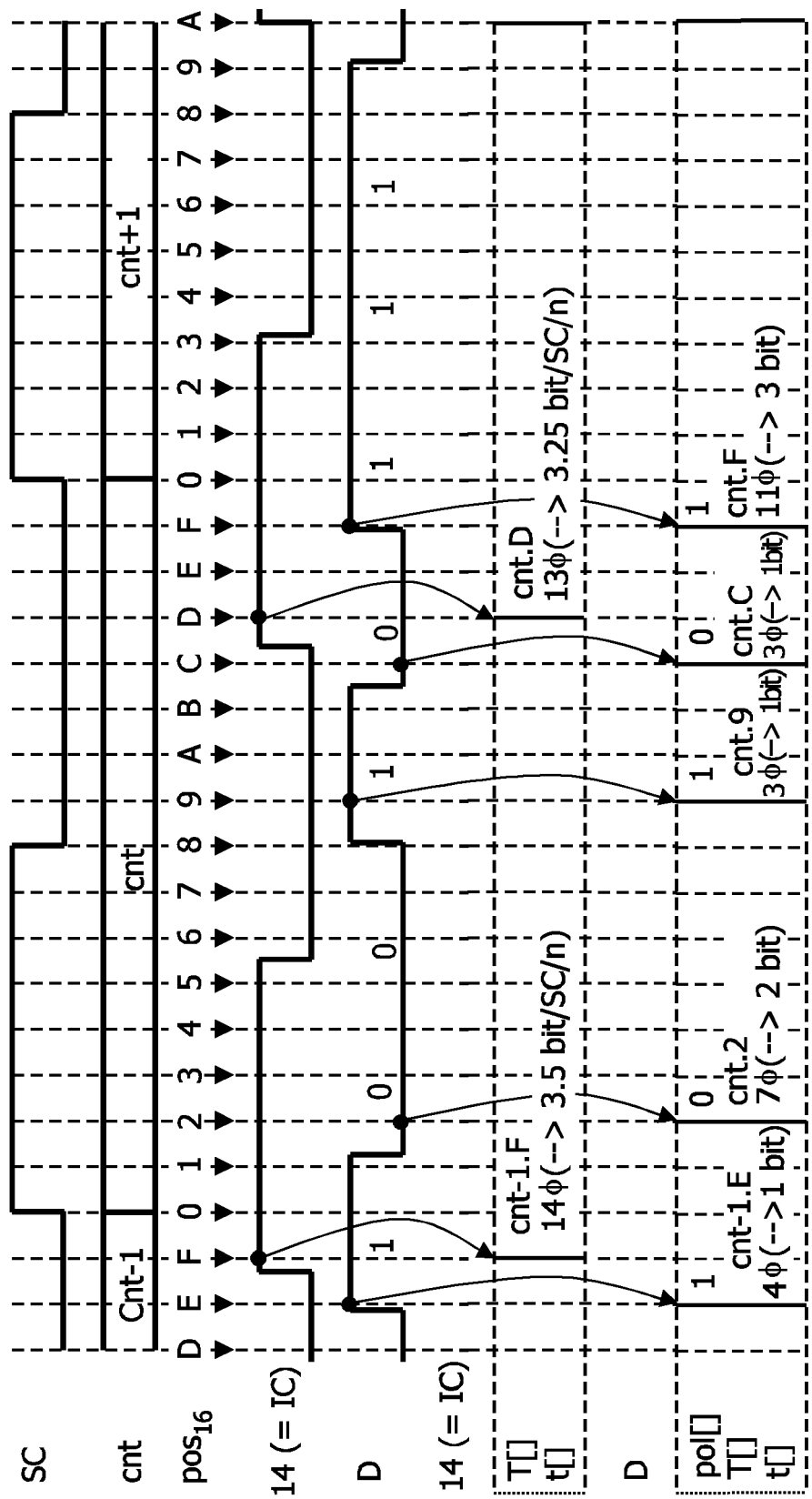
Figure 7:
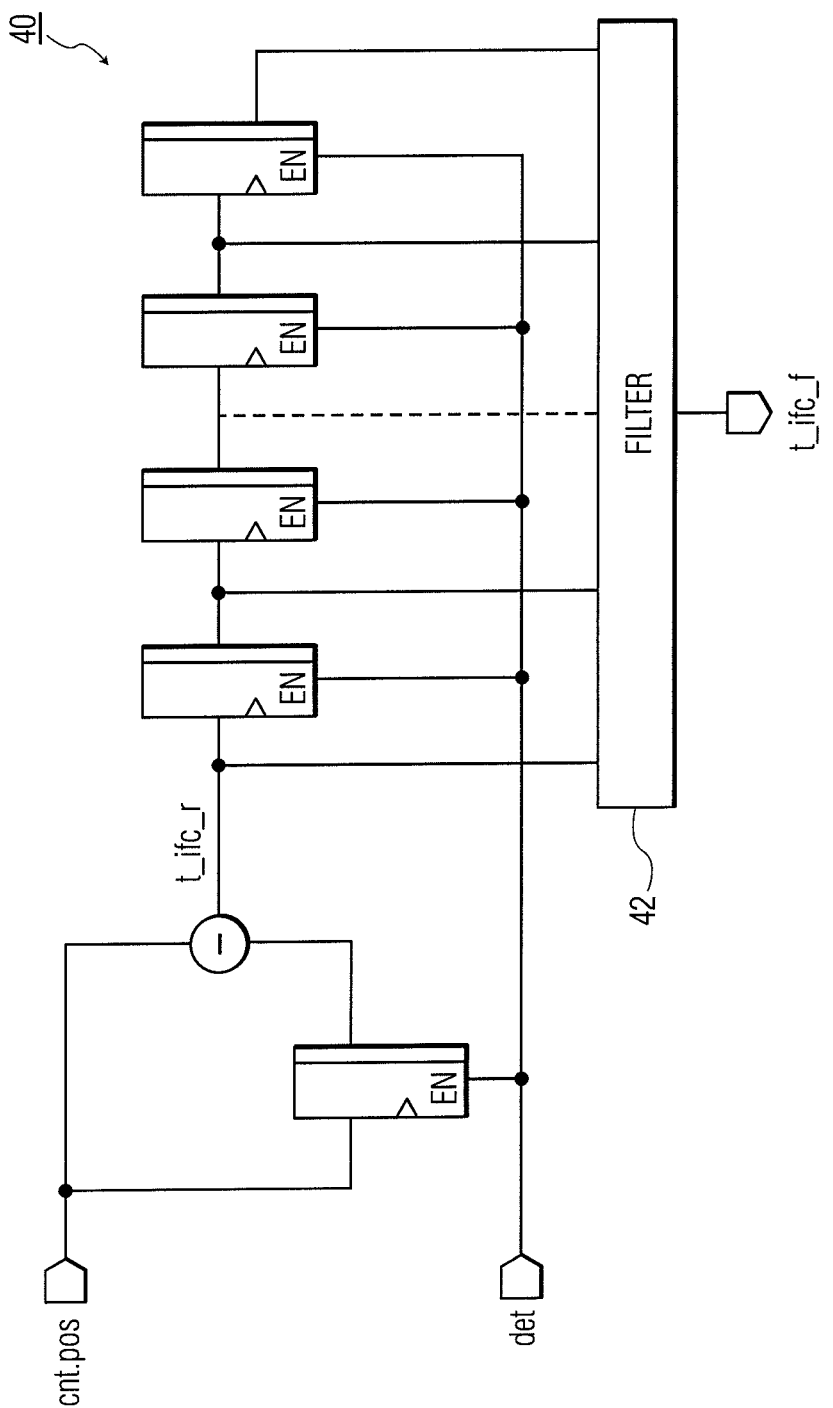
Figure 8:
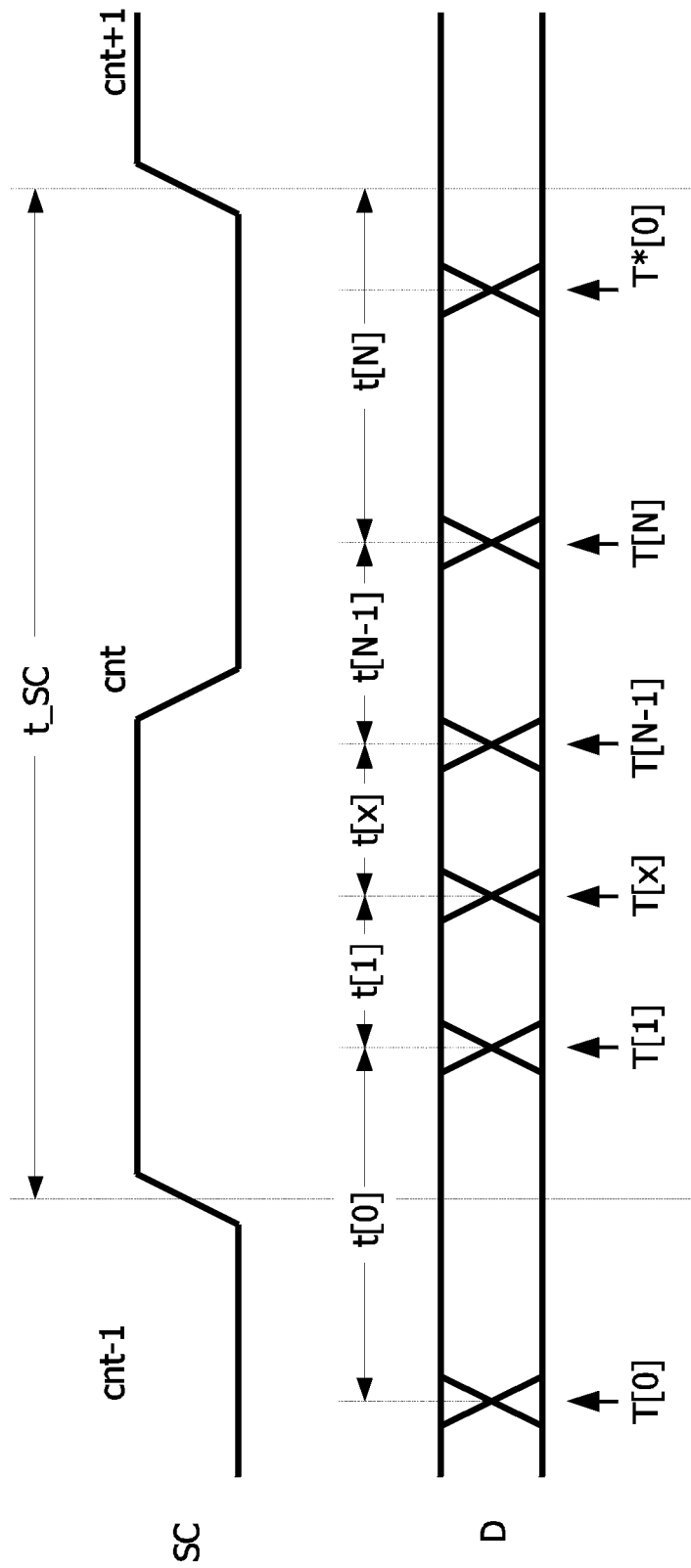
Figure 9A:
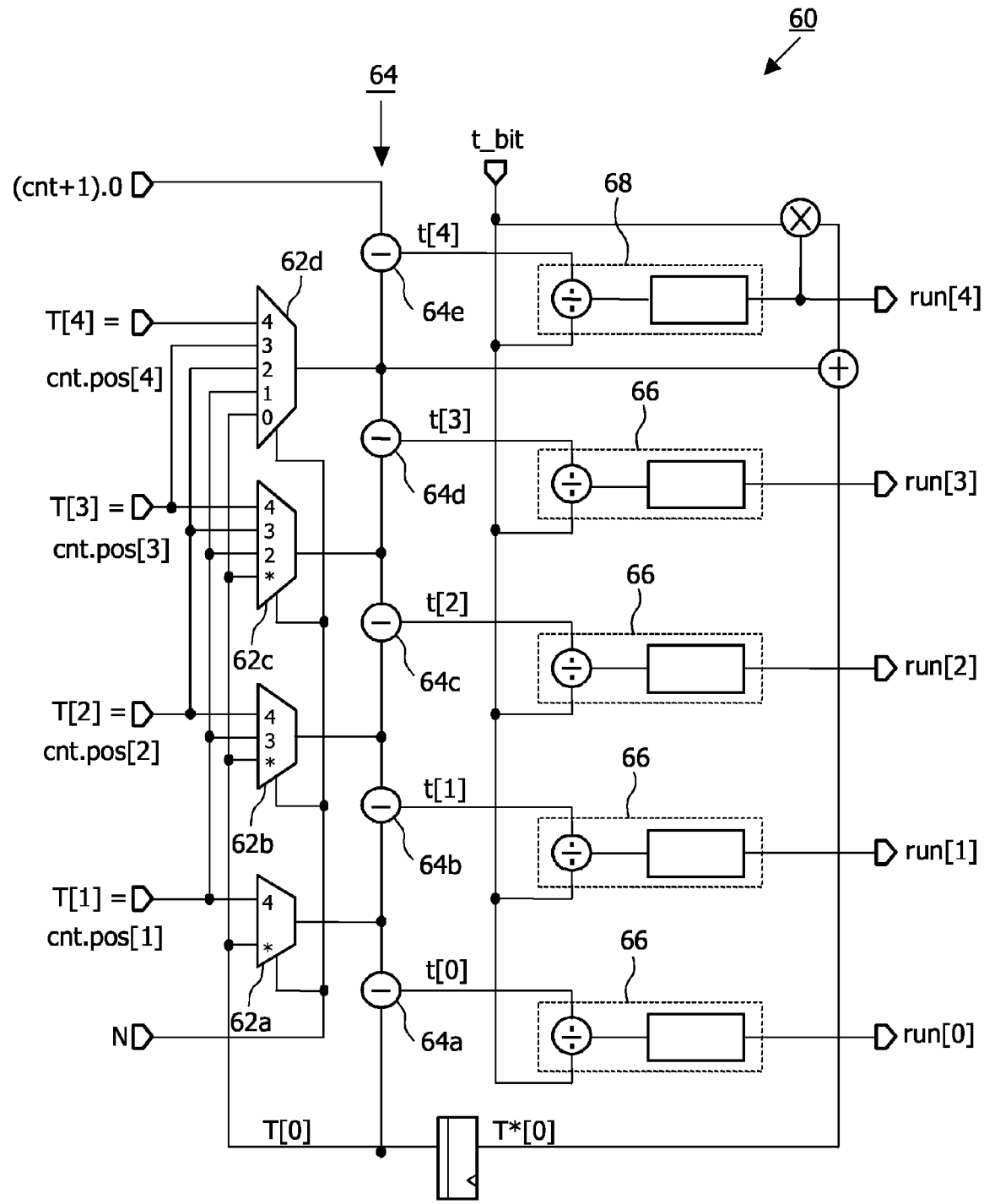
Figure 9B:
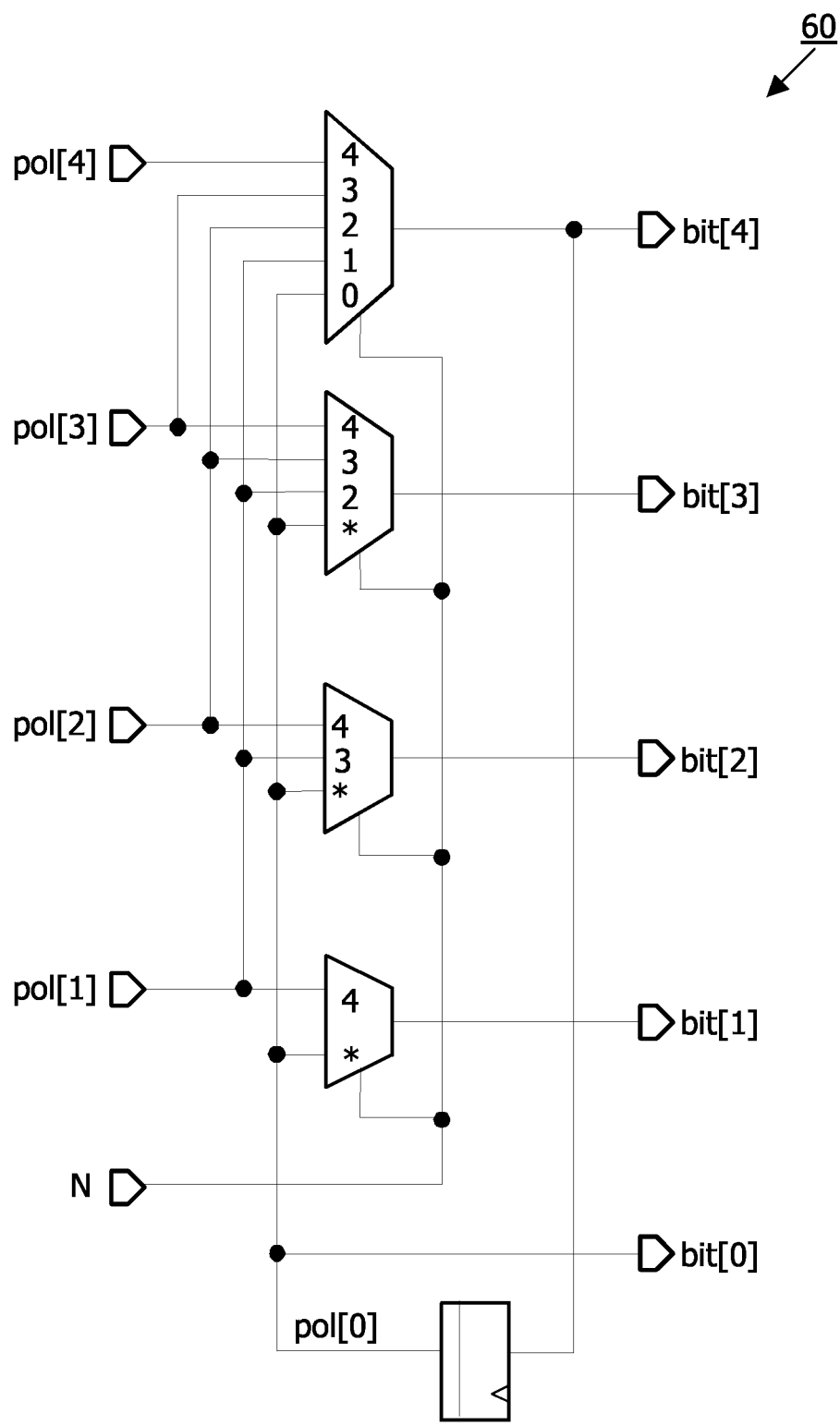
Figure 10A:
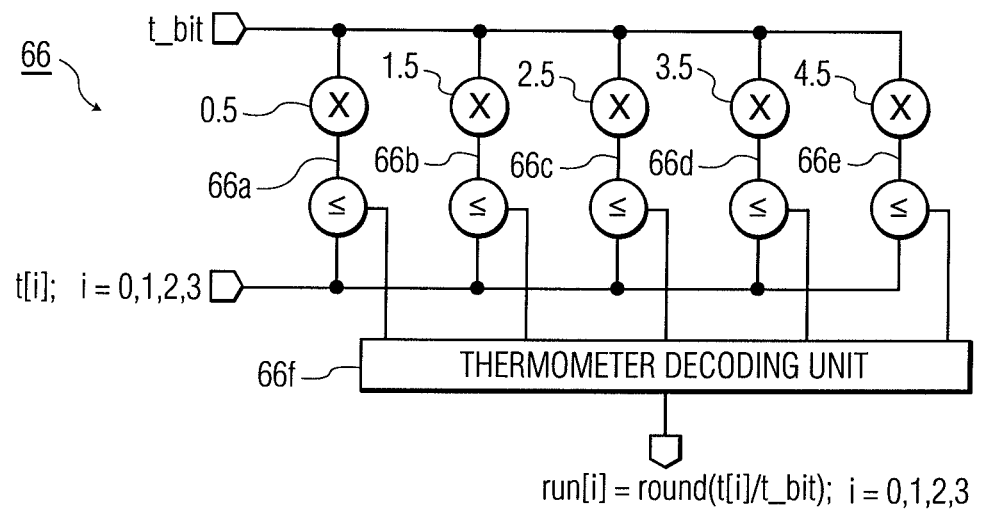
Figure 10B:
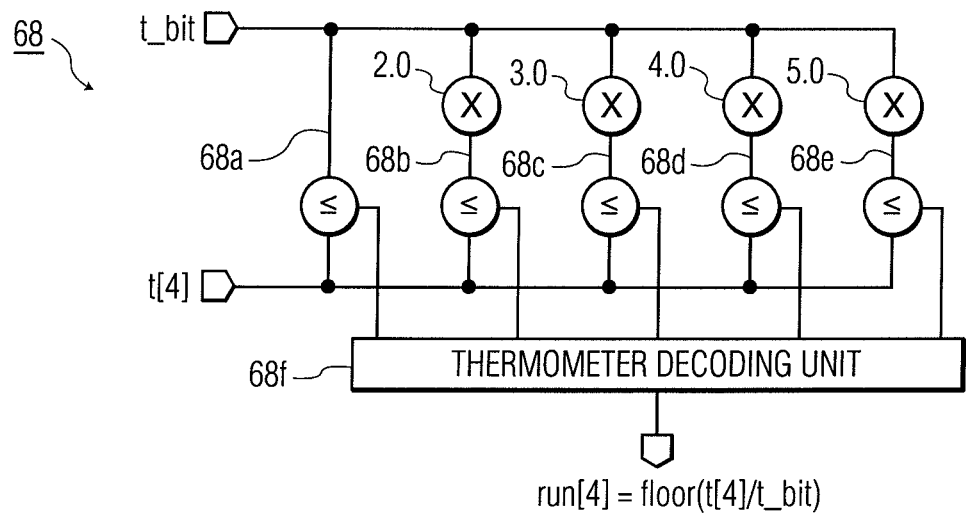
Figure 11:
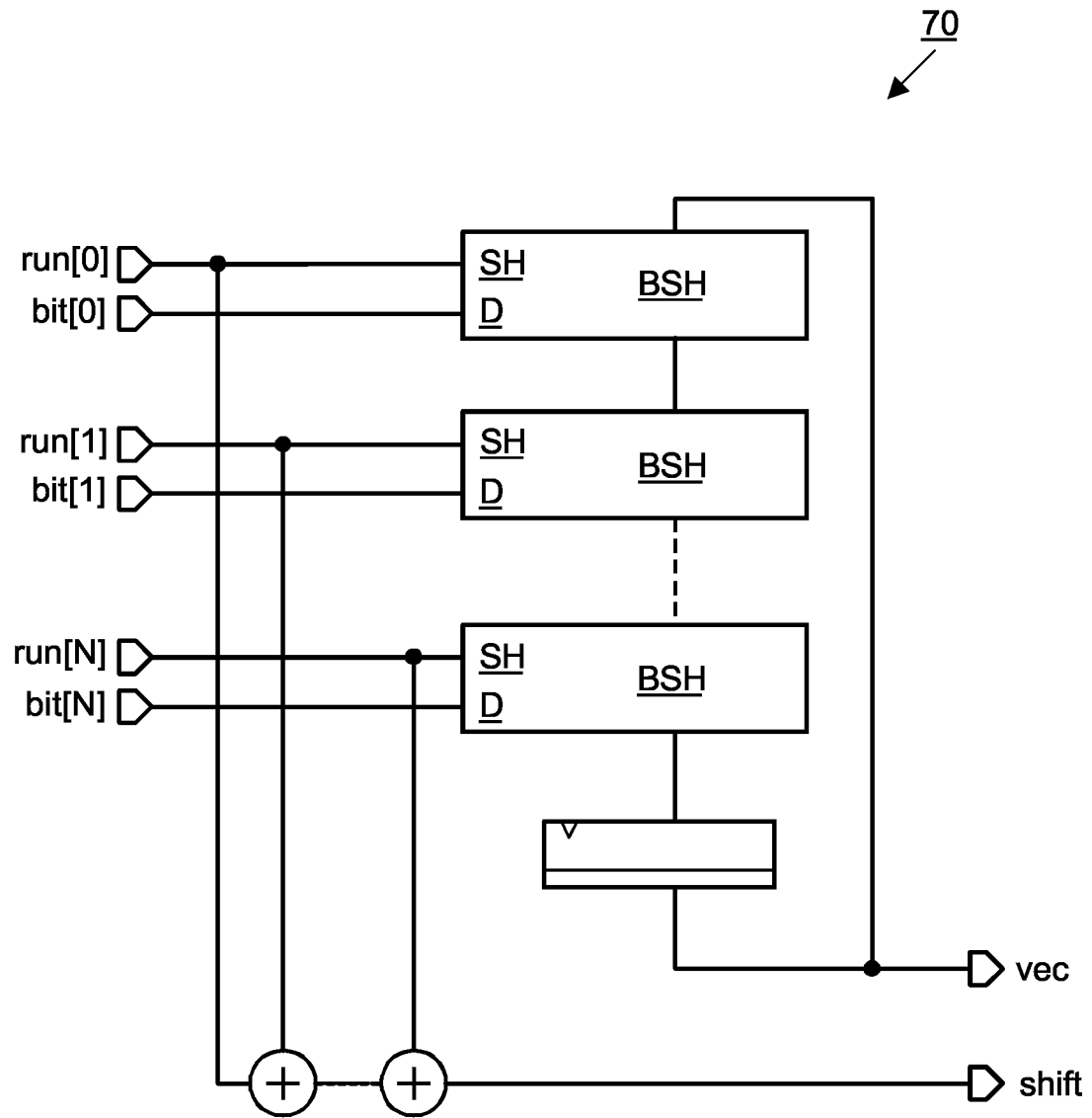
Figure 12:
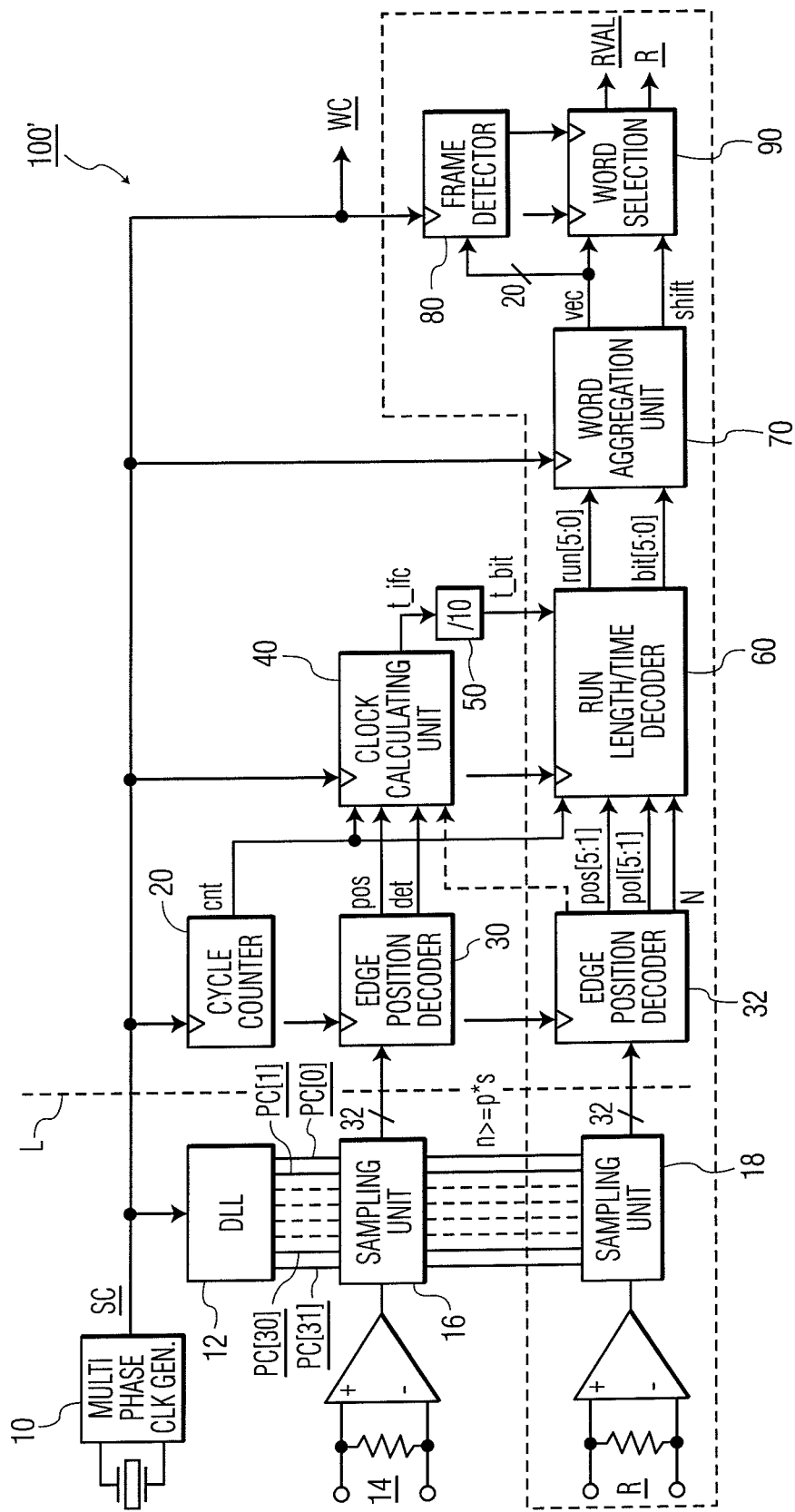

As already discussed above, there are several options to embody as well as to improve the teaching of the present invention in an advantageous manner. To this aim, reference is made to the claims respectively dependent on claim 1 and on claim 8; further improvements, features and advantages of the present invention are explained below in more detail with reference to two preferred embodiments by way of example and to the accompanying drawings (cf. FIG. 4C to FIG. 12) where FIG. 1 schematically shows a block diagram of an interface circuit with synchronous sampling architecture according to the prior art;

FIG. 2 schematically shows a block diagram of an interface circuit with synchronous super sampling architecture according to the prior art;

FIG. 3 schematically shows a time diagram of the multi-phase clock relating to the prior art synchronous super sampling architecture of FIG. 2;

FIG. 4A schematically shows a time diagram of the synchronous phase adjust sampling technique according to the prior art;

FIG. 4B schematically shows a time diagram of the synchronous super sampling technique according to the prior art;

FIG. 4C schematically shows a time diagram of the asynchronous sampling technique according to the present invention;

FIG. 5 schematically shows a block diagram of a first embodiment of an interface circuit with asynchronous super sampling architecture according to the present invention, this interface circuit working according to the method of the present invention;

FIG. 6 schematically shows a time diagram of transition recording with respect to the asynchronous super sampling architecture of FIGS. 5 and 12;

FIG. 7 schematically shows a block diagram of an embodiment of a clock calculating unit as comprised by the interface circuit of FIGS. 5 and 12, the clock calculating unit being designed for interface clock measurement;

FIG. 8 schematically shows a time diagram of the run-length data decoding algorithm or run-time data decoding algorithm with respect to the asynchronous super sampling architecture of FIGS. 5 and 12;

FIG. 9A schematically shows the first part of a block diagram of an embodiment of a run-length decoding unit or run-time decoding unit as comprised by the interface circuit of FIGS. 5 and 12;

FIG. 9B schematically shows the second part of a block diagram of an embodiment of a run-length decoding unit or run-time decoding unit as comprised by the interface circuit of FIGS. 5 and 12;

FIG. 10A schematically shows a block diagram of a first embodiment of a run-length comparison network unit or run-time comparison network unit as comprised by the interface circuit of FIGS. 5 and 12;

FIG. 10B schematically shows a block diagram of a second embodiment of a run-length comparison network unit or run-time comparison network unit as comprised by the interface circuit of FIGS. 5 and 12;

FIG. 11 schematically shows a block diagram of an embodiment of a word aggregating unit or word collecting unit as comprised by the interface circuit of FIGS. 5 and 12; and FIG. 12 schematically shows a block diagram of a second embodiment of an interface circuit with asynchronous super sampling architecture according to the present invention, this interface circuit working according to the method of the present invention.

The same reference numerals are used for corresponding parts in FIG. 1 to FIG. 12.

In order to avoid unnecessary repetitions, the following description regarding the embodiments, characteristics and advantages of the present invention relates (unless stated otherwise)
  to the first embodiment of the interface circuit 100 according to the present invention (cf. FIG. 5) as well as
  to the second embodiment of the interface circuit 100' according to the present invention (cf. FIG. 12),
  all embodiments 100, 100' being operated according to the method of the present invention.

The present invention is based on receiving and decoding high speed serial data with a sampling clock SC having neither a fixed phase relation nor a fixed frequency relation to the interface clock IC and to the data D (=asynchronous sampling technique; cf. FIG. 4C); in other words, the sampling clock can be maintained independent of the transmission frequency. It is assumed that the sampling clock SC is sufficiently higher than the interface bit rate to guarantee a minimum number of super-samples and that its jitter is well below the phase resolution.

An embodiment 100 of an asynchronous super sampling architecture is shown in FIG. 5. The elements to the left of the dotted line L are analog; the elements to the right of the dotted line L are digital.

Basically, the asynchronous super sampling device 100 works as follows:
  n samples are collected with an asynchronous multi-phase clock PC[n-1:0];
  up to p payload bits are extracted from every array of n samples;
  the period and the phase are calculated and/or filtered from edge transitions with sub-sample precision (fractions of the sampling phase resolution);
  temporal information is processed in binary timestamp arithmetic; and
  two words or more are collected, boundaries are detected and a word is selected.

In more detail, the multi-phase sampling clock SC with n different phases is generated from a free running (crystal) reference clock RC by means of a P[hase-]L[ocked]L[oop] 10; this P[hase-]L[ocked]L[oop] 10 is part of a multi-phase clock generating means 10, 12.

In this context, it has to be seen with respect to the implementation of the present invention that any means 10, 12 for generating a multi-phase clock can be provided; in other words, such means 10, 12 are not to be coupled to the explicit presence of a P[hase-]L[ocked]L[oop] and/or of a D[elay]L[ocked]L[oop] (some P[hase-]L[ocked]L[oop]s can generate multi-phase clocks directly); only the presence of a multi-phase clock is relevant, and it does not matter how such multi-phase clock has been generated.

The number n of different phases and the sample clock SC have to be high enough to maintain a number s of minimum samples per data bit at the highest possible data rate. The number s of minimum samples has to be equal to or higher than three; a higher number s of minimum samples makes detection more robust.

It is advantageous for the later calculations but not required that the number n of different phases is a power of two. The sampling clock SC has to be low enough to allow the arithmetic processing in the later stages. A lower sampling clock frequency is traded against a higher number of sampling phases; this does not necessarily mean
  more multi-phase sampling clock lines PC[n-1:0] originating from the D[elay-]L[ocked]L[oop] 12 (n phases), this D[elay-]L[ocked]L[oop] 12 being also part of the multi-phase clock generating means 10, 12, and/or
  more samplers 16, 18.

The multi-phase sampling clock frequency can alternatively be a multiple of the sampling clock SC, and multiple samples can be accumulated for the n-bit vector. Moreover both edges of PC[n-1:0], i. e. PC[n-1] and PC[0] might be used for sampling.

The interface clock IC is sampled with all phases of the multi-phase sampling clock lines PC[n-1:0] in the samplers 16, 18. The occurrence (reference numeral det in FIG. 5) and the phase position (reference numeral pos in FIGS. 5 and 6) of negative and/or positive clock edges within a sampling clock cycle is detected from the sampled pattern; in this context, the sampling clock cycles are counted in a cycle counter 20.

Regarding the occurrence det and the phase position pos of negative and/or positive clock edges within a sampling clock cycle, reference is also made to FIG. 6 where a transition recording is illustrated. A pre-filter may be applied to the sampled pattern to eliminate spikes. With a sampling clock SC higher than the interface clock IC, a maximum of one edge of a given polarity P within one sampling clock cycle can be assured.

A signal transition phase (reference numeral pos in FIGS. 5 and 6) together with the number (reference numeral cnt in FIGS. 5 and 6) of the sampling clock cycle it is occurring in, shall be called the timestamp T=cnt.pos of the transition. A free-running sampling clock cycle counter 20 delivers continuous increments of the cycle number cnt-Timestamps T can be related to each other with simple binary arithmetic.

A clock calculator 40 as shown in FIG. 5 and in more detail in FIG. 7 determines the time between two subsequent I[nterface]C[lock] transitions of equal polarity P (H[igh]-L[ow] or L[ow]-H[igh]) by subtracting their timestamps T=cnt.pos. The binary result represents the actual I[nterface]C[lock] period t_ifc_r[aw].

Subsequent I[nterface]C[lock] period measurements are combined to a filtered result t_ifc_f[iltered] with fractional precision, using a filter function 42, for instance a F[inite]I[mpulse]R[esponse] filter or an I[nfinite]I[mpulse]R[esponse]. The I[nterface]C[lock] period is a known multiple (factor r; cf. also FIGS. 1 and 2) of the bit clock period. With a binary division the bit clock period t_bit (cf. also FIG. 5) can be calculated.

The clock information is not necessarily derived from a interface clock unit or from a interface clock channel 14 (leading to a so-called explicit interface clock) but may also be derived from the data (leading to a so-called implicit or data-embedded interface clock); for instance, the I[nterface]C[lock] period may also be derived form the transition information (pos[ ], pol[ ], N) of the data stream between the edge position decoder unit 32 and the run-length decoder unit or run-time decoder unit 60 (cf. FIG. 5); this however requires a coding scheme that facilitates clock recovery.

One or multiple data signals are sampled with all n phases of the clock PC[n-1:0]. A maximum of 1+floor(n/s) data transitions may occur in one sampling clock cycle (wherein "floor" returns the next lowest integer value by rounding down the input value, i. e. the ratio of the number n of different phases to the number s of super samples per payload bit p). The position pos[ ] and the resulting signal polarity pol[ ] of each transition is decoded from the sampled pattern in the transition recording (cf. FIG. 6). A pre-filter may be applied to the sampled pattern to eliminate spikes.

FIG. 8 illustrates the run-length data decoding of the present invention being implemented by a run-length data decoding algorithm or by a run-time data decoding algorithm. The payload bits p are extracted from the position information pos[ ] and from the polarity information pol[ ] by measuring the time t[x]=T[x+1]−T[x] between signal transitions T[x]=cnt.pos. The timestamp T[0] marks the last transition prior to the current sampling clock cycle.

The pulse duration t[x]=T[x+1]−T[x] between signal transitions T[x] is converted with a rounding function "round" into a code-run-length run[x]=round(t[x]/t_bit) in units of bits. In this context, the rounding function round works such that
- pulse durations t[x] shorter than half the bit clock period t_bit (, i. e. t[x]/t_bit less than 0.5) are considered invalid,
- pulse durations t[x] between half the bit clock period t_bit and 1.5 times the bit clock period t_bit (, i. e. 0.5<t[x]/t_bit<1.5) represent one bit,
- pulse durations t[x] between 1.5 times the bit clock period t_bit and 2.5 times the bit clock period t_bit (, i. e. 1.5<t[x]/t_bit<2.5) represent two bits,
- pulse durations t[x] between 2.5 times the bit clock period t_bit and 3.5 times the bit clock period t_bit (, i. e. 2.5<t[x]/t_bit<3.5) represent three bits,
- and so on.

In case of asymmetric rise times and/or in case of asymmetric fall times, different rounding thresholds can be used for high sequences and/or for low sequences. Dependencies of the rise time and/or of the fall time on the preceding run-length run[x] can be taken into account by varying the rounding thresholds per run-length r[x]. Rounding thresholds may also be dynamically adjusted based on information extracted from the data stream.

Additionally the time period t[N]=(cnt+1).0−T[N] elapsing from the last signal transition T[N] within the actual sampling clock cycle to the end of the cycle is computed. The number run[N]=floor(t[N]/t_bit) of complete bits fitting into this time period t[N] is calculated using the floor function, i. e. rounding down to the next integer value.

If no bits fit into this time period t[N], the last actual transition is stored for the next sampling clock cycle. If payload bits p can be extracted already, a hypothetic last transition position T*[0]=T[N]+run[N]*t_bit is calculated and stored for the next sampling clock cycle.

Long bit-clock-cycles (t_bit) or long code-runs lead to sampling clock cycles with no signal transition T. In this case the last signal transition T[N] equals the timestamp T[0] and may have occurred several sampling clock cycles in the past.

If the bit clock period t_bit is longer than the sampling clock cycle time t_SC, several sampling clock cycles may pass without a payload bit p being extracted. The width of the digital sampling clock cycle counter 20 (cf. FIG. 5) has to be dimensioned accordingly.

For long code-runs with the bit clock period t_bit shorter than a sampling clock cycle time t_SC, the timestamp T[0] will always be in the previous sampling clock cycle because payload bits p are extracted even without transitions happening. However, a high maximum run-length requires more precision in the calculation of the bit clock period t_bit. If a code-run spans over several I[nterface]C[lock] cycles, the bit clock period t_bit will be updated several times. This desirable integration effect reduces the required accuracy for the bit clock period t_bit.

The run-length decoding algorithm (cf. FIG. 8) may also be used with synchronous super-sampling. In this case the sampling clock time base correlates with the interface clock, and the bit clock period t_bit=s*Phi (cf. FIG. 3) is constant. Sampling the I[nterface]C[lock] signal as well as the clock calculation becomes obsolete.

FIG. 9A depicts in more detail the run-length decoder circuit 60 (as also shown in FIG. 5) for up to four transitions T[1]=cnt.pos[1], T[2]=cnt.pos[2], T[3]=cnt.pos[3], T[4]=cnt.pos[4] within one sampling clock cycle. The unused transition timestamps are "shifted" out of the subtraction chain 64 using four multiplexers 62a, 62b, 62c, 62d being connected in advance of the subtraction chain 64.

As can be taken from FIG. 9A, said subtraction chain 64 computes the time differences t[x]=T[x+1]−T[x] between the timestamps T[x]=cnt.pos a; to this aim, said subtraction chain 64 comprises five subtractor units 64a, 64b, 64c, 64d, 64e each of which being assigned to a network 66, 68 as shown in FIGS. 10A and 10B. By way of run-length comparison, the computed time differences t[0], t[1], t[2], t[3], t[4] are compared against multiples of the bit clock period t_bit by means of the networks 66, 68.

In more detail, the so-called round network 66 according FIG. 10A is designed to compare the time differences t[0]=T[1]−T[0], t[1]=T[2]−T[1], t[2]=T[3]−T[2] and t[3]=T[4]−T[3] against half-numbered multiples of the bit clock period t_bit:
- by the first (, in FIG. 10A left) comparison path 66a the time differences t[0], t[1], t[2], t[3] are compared against half the bit clock period t_bit,
- by the second comparison path 66b the time differences t[0], t[1], t[2], t[3] are compared against 1.5 times the bit clock period t_bit,
- by the third comparison path 66c the time differences t[0], t[1], t[2], t[3] are compared against 2.5 times the bit clock period t_bit, by the fourth comparison path 66d the time differences t[0], t[1], t[2], t[3] are compared against 3.5 times the bit clock period t_bit, and by the fifth (, in FIG. 10A right) comparison path 66e the time differences t[0], t[1], t[2], t[3] are compared against 4.5 times the bit clock period t_bit, the five comparison paths 66a, 66b, 66c, 66d, 66e being parallel to each other.

The multiplications with constant half-numbered factors (0.5, 1.5, 2.5, 3.5, 4.5) can be economically built with shift and add operations to the binary t_bit (=bit clock period); reference numeral 66f denotes a thermometer decoder the output signal run[0], run[1], run[2], run[3] is treated with.

In contrast thereto, the so-called floor network 68 according FIG. 10B is designed to compare the time difference t[4]=T[5]−T[4] against whole-numbered multiples of the bit clock period t_bit:

by the first (, in FIG. 10B left) comparison path 68a the time difference t[4] is compared against (one times) the bit clock period t_bit, by the second comparison path 68b the time difference t[4] is compared against two times the bit clock period t_bit, by the third comparison path 68c the time difference t[4] is compared against three times the bit clock period t_bit, by the fourth comparison path 68d the time difference t[4] is compared against four times the bit clock period t_bit, and by the fifth (, in FIG. 10B right) comparison path 68e the time difference t[4] is compared against five times the bit clock period t_bit, the five comparison paths 68a, 68b, 68c, 68d, 68e being parallel to each other.

The multiplications with constant whole-numbered factors (1, 2, 3, 4, 5) can be economically built with shift and add operations to the binary t_bit (=bit clock period);

reference numeral 68f denotes a thermometer decoder the output signal run[4] is treated with.

The circuitry in FIG. 9B is also part of the run-length decoder circuit 60 and is designed to align the respective signal polarity values pol[0], pol[1], pol[2], pol[3], pol[4] of the respective transition T[0], T[1], T[2], T[3], T[4] with the respective run-length result run[0]=round(t[0]/t_bit), run[1]=round(t[1]/t_bit), run[2]=round(t[2]/t_bit), run[3]=round(t[3]/t_bit), run[4]=floor(t[4]/t_bit), resulting in the respective bit-value bit[0], bit[1], bit[2], bit[3], bit[4].

FIG. 11 shows how the run-length information run[0], run[1], . . . , run[N] and the respectively assigned bit-value bit[0], bit[1], . . . , bit[N]

(both output from the run-length decoder 60 as shown in FIG. 5 and FIGS. 9A, 9B) are accumulated or aggregated into code words by means of the word aggregator/collecting unit 70 also shown in FIG. 5.

A resulting bit vector vec contains the history of decoded bits in temporal order. New bits bit[ ] are shifted in (<-->  reference numeral SH in FIG. 11) by a run-length run[ ] number of times and in temporal order. A number of run[ ] old bits are shifted out (<--> reference numeral SH in FIG. 11); the reference numeral BSH denotes the respectively assigned barrel shifter.

The bit vector vec carries twice the number of bits per word. This assures that the bit vector vec always contains one complete word. Moreover, the total number of newly inserted bits is calculated in order to support the word selection. Whenever the bit vector vec contains sufficient new bits for one word, they are aligned and validated for one output cycle.

A frame detector 80 as shown in FIG. 5 recognizes word boundaries based on the encoding scheme. This may only be possible for a few synchronization words, which are inserted on a regular basis. Without synchronization, words are output only based on the number of newly decoded bits.

FIG. 12 depicts the block diagram of an architecture for a high speed digital interface, namely for a D[igital]V[isual]I [nterface] receiver circuit (with the elements to the left of the dotted line L being analog and with the elements to the right of the dotted line L being digital), employing the asynchronous sampling and data recovery architecture and method according to the present invention, as exemplified by FIGS. 4C to 11.

A fixed reference clock SC of 250 Megahertz is derived from a free running 25 Megahertz crystal oscillator 8 by means of a P[hase-]L[ocked]L[oop] 10; this P[hase-]L [ocked]L[oop] 10 is part of a multi-phase clock generating means 10, 12. A D[elay-]L[ocked]L[oop] 12 being also part of the multi-phase clock generating means 10, 12 generates thirty-two sampling phases PC[31], PC[30], . . . , PC[1], PC[0] with equidistant spacing and with low jitter, thus providing a sampling resolution of 125 Picoseconds=1/(32*250 Megahertz).

The 25 Megahertz to 165 Megahertz [--> maximal bit duration 606 Picoseconds=1/(10*165 MHz)] clock channel 14 and all data channels R[ed], G[reen], B[lue] are sampled with arrays of samplers (=D-type register 16 assigned to the clock channel 14, respective D-type registers 18 assigned to the respective data channels R[ed], G[reen], B[lue]).

Edge position decoders 30, 32 are respectively assigned to the samplers 16, 18 and detect signal transitions of the clock signal with positive or negative polarity; the edge position decoders 30, 32 signalize their position within the sampling clock cycle as well as the fact that a transition occurred. The DVI symbol clock period is computed in a clock calculator 40 and divided by ten in a divider unit 50 in order to obtain the duration of one bit.

In FIG. 12, only the red data channel R[ed] is depicted but the green data channel G[reen] and the blue data channel B[lue] are to be replicated. For the red data channel R[ed], for the green data channel G[reen] and for the blue data channel B[lue], edge position decoders 30, 32 are used; these edge position decoders 30, 32 are designed to detect up to five bit transitions (each vector of thirty-two samples contains up to five bit transitions).

The number run[ ] of bits between transitions is computed in the run-length-decoder 60 (cf. also FIGS. 8 to 10B). D[igital]V[isual]I[nterface] uses an eight to ten bit D[irect]C[urrent]-balanced encoding scheme advantageously limiting the maximum run-length. Newly decoded bits are accumulated or aggregated to a twenty bit vector in the word aggregator unit or word accumulating unit 70.

DVI provides word synchronization with reserved control words during video blanking. These words are recognized with the frame detector 80, and initialize the word selection in the word selection unit 90 whenever they occur. After initialization the word selection unit 90 packages ten bit words purely based on the number of new bits arriving.

For a complete DVI receiver the ten bit symbols have to be decoded to eight bit color data, data enable information and two bits of control information. Moreover, a channel alignment is required, i. e. the color information has to be aligned between the three data transmission channels using the data enable information; this can be performed like with traditional sampling schemes.

The interface clock IC of DVI is equivalent to the word clock WC. It may be desirable to resynchronize the data from the sampling clock domain to the interface clock domain IC.

List of Reference Numerals 100 interface circuit (first embodiment; cf. FIG. 5)
100' interface circuit (second embodiment; cf. FIG. 12)
8 oscillating unit, in particular free running crystal oscillator
10, 12 multi-phase clock generating means
10 P[hase-]L[ocked]L[oop] unit of multi-phase clock generating means 10, 12
12 D[elay-]L[ocked]L[oop] unit (n phases) of multi-phase clock generating means 10, 12
14 interface clock unit or interface clock channel
16 first sampler unit, in particular D-type register, assigned to the interface clock channel 14
18 second sampler unit, in particular respective D-type register, assigned to the respective data channel R[ed], G[reen], B[lue]
20 cycle counting unit
30 first edge position decoding unit
32 second edge position decoding unit
40 clock calculating unit
42 filter, in particular function, for instance F[inite]I[mpulse]R[esponse] filter or I[nfinite]I[mpulse]R[esponse], of clock calculating unit 40
50 dividing unit
60 run-length decoder unit or run-time decoder unit
62a first multiplexing unit of run-length decoding unit 60
62b second multiplexing unit of run-length decoding unit 60
62c third multiplexing unit of run-length decoding unit 60
62d fourth multiplexing unit of run-length decoding unit 60
64 subtraction chain of run-length decoding unit 60
64a first subtracting unit of subtraction chain 64
64b second subtracting unit of subtraction chain 64
64c third subtracting unit of subtraction chain 64
64d fourth subtracting unit of subtraction chain 64
64e fifth subtracting unit of subtraction chain 64
66 first network unit, in particular network with function "round", of run-length decoding unit 60
66a first comparison path of first network unit 66
66b second comparison path of first network unit 66
66c third comparison path of first network unit 66
66d fourth comparison path of first network unit 66
66e fifth comparison path of first network unit 66
66f thermometer decoding unit of first network unit 66
68 second network unit, in particular network with function "floor", of run-length decoding unit 60
68a first comparison path of second network unit 68
68b second comparison path of second network unit 68
68c third comparison path of second network unit 68
68d fourth comparison path of second network unit 68
68e fifth comparison path of second network unit 68
68f thermometer decoding unit of second network unit 68
70 word aggregating unit or word collecting unit
80 frame detecting unit
90 word selecting unit
A synchronous sampling architecture (prior art; cf. FIG. 1)
A' synchronous super-sampling architecture (prior art; cf. FIG. 2)
bit bit value
B[lue] third data signal or third data channel
BS bit selecting unit (prior art; cf. FIGS. 1 and 2)
BSH barrel shifting unit
BVAL third value signal
C word aggregating unit or word collecting unit (prior art; cf. FIGS. 1 and 2)
cnt number of cycle of sampling clock SC
D data signal or data channel
det occurrence of positive clock edges and/or of negative clock edges within a cycle of the sampling clock SC
DLL delay-locked loop unit (prior art; cf. FIGS. 1 and 2)
EN enable
FD frame detecting unit (prior art; cf. FIGS. 1 and 2)
G[reen] second data signal or second data channel
GVAL second value signal
IC interface clock signal or interface clock unit or interface clock channel (prior art; cf. FIGS. 1 and 2)
L dotted line separating analog elements of interface circuit 100, 100' from digital elements of interface circuit 100, 100'
n (=p*s) phase
N number of samples, in particular in the form of n-bit vector of samples
p payload bit
PC[n-1:0] multi-phase sampling clock signal with n different phases
PD phase detecting unit (prior art; cf. FIGS. 1 and 2)
phi phase delay
PLL phase-locked loop unit (prior art; cf. FIGS. 1 and 2)
pol signal polarity of transition
pos phase position of positive clock edges and/or of negative clock edges within a cycle of the sampling clock SC
R[ed] first data signal or first data channel
run code-run-length
RVAL first value signal
s super sample
S sampler unit (prior art; cf. FIGS. 1 and 2)
SC sampling clock signal
SH shifting unit
t time
t[ ] time difference, in particular pulse duration
t_bit time period of bit clock
t_ifc time period of interface clock unit 14
t_ifc_f filtered time period
t_ifc_r raw time period
t_SC cycle time of sampling clock SC
T timestamp
T*[0] hypothetic last transition position
vec resulting bit vector
W word signal
WC word clock signal
WS word selecting unit (prior art; cf. FIGS. 1 and 2)
WVAL word value signal

The invention claimed is:

1. An interface circuit to receive and decode data signals, the interface circuit comprising:
a multi-phase clock generating circuit arranged and configured to generate a multi-phase sampling clock signal with n different phases by delaying a sampling clock signal,
wherein the sampling clock signal is asynchronous to at least one interface clock signal, by which the interface circuit is arranged and configured to receive, and to the data signals,
a sampling circuit arranged and configured to receive the multi-phase sampling clock signal, and sample the data signals with the n difference phases of the multi-phase sampling clock signal, and
wherein the data signals are received and decoded by measuring a run-length or measuring a run-time to determine a fractional position of the data signals; and
characterized in that the sampling circuit further comprises at least one first sampler unit arranged and configured to receive the multi-phase sampling clock signal from the multi-phase clock generating circuit and the at least one interface clock signal, and at least one second sampling unit arranged and configured to receive the multi-phase sampling clock signal from the multi-phase clock generating circuit and the data signals.

2. The interface circuit according to claim 1, characterized in that the multi-phase sampling clock signal has neither a fixed phase relation nor a fixed frequency relation to the at least one interface clock signal, said at least one interface clock signal originating from at least one interface clock unit or from at least one interface clock channel, and has neither a fixed phase relation nor a fixed frequency relation to the data signals.

3. The interface circuit according to claim 2, characterized in that the multi-phase clock generating circuit includes at least one phase-locked loop unit configured to derive the sampling clock signal from at least one free-running reference clock signal.

4. The interface circuit according to claim 3, wherein the multi-phase clock generating circuit includes at least one delay-locked loop unit configured to generate the multi-phase sampling clock signal with n different phases by delaying the sampling clock signal.

5. The interface circuit according to claim 1, wherein:
the first sampling unit is arranged and configured to sample the at least one interface clock signal with the n different phases of the multi-phase sampling clock signal; and
the second sampling unit is arranged and configured to sample the data signals with the n different phases of the multi-phase sampling clock signal.

6. An interface circuit to receive and decode data signals, the interface circuit comprising:
a clock generation circuit arranged and configured to generate a multi-phase sampling clock signal with n different phases by delaying a sampling clock signal,
wherein the sampling clock signal is asynchronous to at least one interface clock signal, by which the interface circuit is arranged and configured to receive, or to the data signals,
first and second sampler units, each arranged and configured to receive the multi-phase sampling clock signal from the clock generating circuit; and
a digital part including:
at least one cycle counting unit arranged and configured with the sampling clock signal and being designed to count a number of cycles of the sampling clock signal,
at least one first edge position decoding unit arranged and configured with the sampling clock signal as well as with an output signal from the first sampler unit,
at least one second edge position decoding unit arranged and configured with the sampling clock signal as well as with an output signal from the second sampler unit,
the at least one first edge position decoding unit or the at least one second edge position decoding unit being arranged and configured to detect signal transitions and a respective timestamp of said signal transitions, with positive or negative polarity,
at least one clock calculating unit arranged and configured with the sampling clock signal, with an output signal from the cycle counting unit, as well as with output signals from the first edge position decoding unit, and arranged and configured to determine a time difference between two subsequent signal transitions of equal polarity by subtracting the timestamps of said subsequent signal transitions,
at least one run-length decoding unit arranged and configured with the sampling clock signal, with the output signal from the cycle counting unit, as well as with output signals from the second edge position decoding unit, and arranged and configured to determine a respective run-length value as well as a respective bit-value,
at least one word aggregating unit or word collecting unit arranged and configured with the sampling clock signal as well as with output signals from the at least one run-length decoding unit and arranged and configured for aggregating or collecting said output signals from the at least one run-length decoding unit into code words,
at least one frame detecting unit arranged and configured with the sampling clock signal as well as with a first output signal from the at least one word aggregating unit or word collecting unit and arranged and configured to recognize said code words, on the basis of at least one encoding scheme, or
at least one word selecting unit arranged and configured with the sampling clock signal, with the first output signals from the at least one word aggregating unit or word collecting unit, as well as with an output signal from the at least one frame detecting unit and arranged and configured to package words of a certain bit-length after initialization.

7. The interface circuit according to claim 6, characterized in that the run-length decoding unit includes at least one subtraction chain of subtraction units for subtracting the timestamps of two subsequent signal transitions of equal polarity, each subtracting unit of said subtraction chain being assigned
to at least one first network comprising a function by which the time difference is converted into the respective run-length value with t_bit being the bit clock period or
to at least one second network comprising a function by which the time difference is converted into the respective run-length value with t_bit being the bit clock period.

8. A method for receiving and decoding data signals, the method comprising
receiving and decoding the data signals from measuring a run-length or measuring a run-time,
determining a fractional position of the received and decoded data signals,
wherein the method further comprises
counting a number of cycles of at least one sampling clock signal,
detecting signal transitions, in particular the respective timestamp of said signal transitions, with positive or negative polarity,
determining a time difference between two subsequent signal transitions of equal polarity by subtracting the timestamps of said subsequent signal transitions,
determining a respective run-length value as well as a respective bit-value,
aggregating or collecting said respective run-length value and said respective bit-value into code words,
recognizing said code words, in particular the boundaries of said code words, on the basis of at least one encoding scheme,
packaging words of a certain bit-length after initialization,
wherein the at least one sampling clock signal including at least one multi-phase sampling clock signal with n different phases, and/or the data signals are delayed, and
wherein the at least one sampling clock signal is asynchronous to at least one interface clock signal, and to the data signals.

9. The method of claim 8 characterized in that the multi-phase sampling clock signal, has neither a fixed phase relation nor a fixed frequency relation to the interface clock signal, and has neither a fixed phase relation nor a fixed frequency relation to the data signals.

10. The method of claim 8 characterized in that one or more skews between a channel of the clock signals and at least one channel of the data signals are compensated with digital processing.

11. The method according to claim 8, characterized in that the determined time difference is compared against at least one half-numbered multiple of a bit clock period.

\* \* \* \* \*